United States Patent

Brady et al.

[11] Patent Number: 5,434,927
[45] Date of Patent: Jul. 18, 1995

[54] METHOD AND APPARATUS FOR MACHINE VISION CLASSIFICATION AND TRACKING

[75] Inventors: Mark J. Brady, Cottage Grove; Darin G. Cerny, Minneapolis; Michelle C. Granholm, Woodbury; Belayneh W. Million, St. Paul, all of Minn.

[73] Assignee: Minnesota Mining and Manufacturing Company, St. Paul, Minn.

[21] Appl. No.: 163,820

[22] Filed: Dec. 8, 1993

[51] Int. Cl.⁶ ............................................. G06K 9/00
[52] U.S. Cl. .................... 382/104; 382/159; 382/199; 348/148; 395/21; 395/905
[58] Field of Search .................. 382/22, 28, 36, 14, 382/1; 395/3, 21, 905, 61; 348/148, 149

[56] References Cited

U.S. PATENT DOCUMENTS

| | | | |
|---|---|---|---|
| 4,490,851 | 12/1984 | Gerhart et al. | 382/43 |
| 4,709,264 | 11/1987 | Tamura et al. | 358/93 |
| 4,839,648 | 6/1989 | Beucher et al. | 340/933 |
| 4,847,772 | 7/1989 | Michalopoulos et al. | 364/436 |
| 4,942,533 | 7/1990 | Kakisami et al. | 364/449 |
| 5,046,111 | 9/1991 | Cox et al. | 382/8 |
| 5,103,305 | 4/1992 | Watanabe | 358/105 |
| 5,111,232 | 5/1992 | Tsunefuji | 354/402 |
| 5,172,226 | 12/1992 | Morimura et al. | 358/105 |
| 5,263,120 | 11/1993 | Bickel | 395/2 |
| 5,280,566 | 1/1994 | Nakamura | 395/51 |
| 5,296,852 | 3/1994 | Rathi | 340/933 |

FOREIGN PATENT DOCUMENTS

0454166A2  4/1991  European Pat. Off. ....... G08G 1/08
WO93/19441  9/1993  WIPO ..................... G08G 1/017

OTHER PUBLICATIONS

Gilbert and Holmes, Dynamic Traffic Information from Remote Video Monitors, Environmental Research Institute of Michigan, Oct. 1991, pp. 213–231.

Zielke, Brauckmann and von Seelen, *Intensity and Eagle-Based Symmetry Detection Applied to Car-Following*, Lecture Notes in Computer Science, vol. 588, G. Sandini (Ed.), Computer Vision–ECCV '92, Springer-Verlag Berlin Heidelberg 1992, pp. 865–873.

Michalopoulos, *Vehicle Detection Video Through Image Processing: The Autoscope System*, IEEE Transactions on Vehicular Technology, vol. 40, No. 1, Feb. 1991, pp. 21–29.

Ali and Dagless, University of Bristol, UK, *Alternative Practical Methods for Moving Object Detection*, International Conference on Image Processing and Its Applications (Conf Publ No. 354), pp. 77–80, 1992.

Primary Examiner—Yon J. Couso
Attorney, Agent, or Firm—Gary L. Griswold; Walter N. Kirn; Michael K. Ouyang

[57] ABSTRACT

A method and apparatus for classification and tracking objects in three-dimensional space is described. A machine vision system acquires images from roadway scenes and processes the images by analyzing the intensities of edge elements within the image. The system then applies fuzzy set theory to the location and angles of each pixel after the pixel intensities have been characterized by vectors. A neural network interprets the data created by the fuzzy set operators and classifies objects within the roadway scene. The system can also track objects within the roadway scene, such as vehicle, by forecasting potential track regions and then calculating match scores for each potential track region based on how well the edge elements from the target track regions match those from the source region as weighted by the extent the edge elements have moved.

29 Claims, 12 Drawing Sheets

METHOD AND APPARATUS FOR MACHINE VISION CLASSIFICATION AND TRACKING

FIELD OF THE INVENTION

This invention relates generally to systems used for traffic detection, monitoring, management, and vehicle classification and tracking. In particular, the invention is directed to a method and apparatus for classifying and tracking objects in images provided by real-time video from machine vision.

BACKGROUND OF THE INVENTION

With the volume of vehicles using roadways today, traffic detection and management has become ever important. For example, control of intersections, detection of incidents, such as traffic accidents, and collection of data related to a traffic scene are all integral to maintaining and improving the state of traffic management and safety. Since the 1950s, point detection devices, such as in-ground inductive loops, have primarily been used for intersection control and traffic data collection. The in-ground inductive loops basically consist of wire loops placed in the pavement, detecting the presence of vehicles through magnetic induction.

Many limitations exist with point detection devices such as the inductive loops. Namely, the inductive loops are limited in area coverage for each individual loop, expensive to install, requiring a roadway to be dug up for their installation, and are difficult to maintain. Further, such point detectors possess substantial limitations in their ability to accurately assess a traffic scene and extract useful information relating to the scene. While point detection devices can detect the presence or absence of vehicles at a particular, fixed location, they cannot directly determine many other useful traffic parameters. Rather, they must determine such parameters through multiple detection and inference. For instance, to calculate the velocity of a vehicle, a traffic management system employing point detection devices requires at least two detection devices to determine the time between detection at two points, thereby resulting in a velocity measurement. Other methods of detection, such as ultrasonic and radar detection also possess similar limitations.

A traffic scene contains much more information than point detection devices can collect. While a point detection device can provide one bit of data, a video image can provide a 300,000 byte description of the scene. In addition to the wide-area coverage provided by video images, the image sequences capture the dynamic aspects of the traffic scene, for example at a rate of 30 images a second. Therefore, advanced traffic control technologies have employed machine vision, to improve the vehicle detection and information extraction at a traffic scene. These machine vision systems typically consist of a video camera overlooking a section of the roadway and a processor that processes the images received from the video camera. The processor then attempts to detect the presence of a vehicle and extract other traffic related information from the video image.

An example of such a machine vision system is described in U.S. Pat. No. 4,847,772 to Michalopoulos et al., and further described in Panos G. Michalopoulos, Vehicle Detection Video Through Image Processing: The Autoscope System, IEEE Transactions on Vehicular Technology, Vol. 40, No. 1, February 1991. The Michalopoulos et al. patent discloses a video detection system including a video camera for providing a video image of the traffic scene, means for selecting a portion of the image for processing, and processor means for processing the selected portion of the image.

The Michalopoulos et al. system can detect traffic in multiple locations, as specified by the user, using interactive graphics. The user manually selects detection lines, which consist of a column of pixels, within the image to detect vehicles as they cross the detection lines. While the manual placement of the detection lines within the image obviates the expense of placing inductance loops in the pavement as well as provides flexibility in detection placement, the Michalopoulos et al. system still roughly emulates the function of point detection systems. The system still detects vehicles at roughly fixed locations and derives traffic parameters by induction, using mathematical and statistical formulae. For example, the system classifies a vehicle based on its length and calculates velocity of a vehicle based on the known distance between detection locations divided by average travel time. Further, if a vehicle crosses through an area within the image where the user has not placed a detection line, the system will not detect the vehicle. Thus, the system does not automatically detect all vehicles within the image.

Before a machine vision system can perform any traffic management capabilities, the system must be able to detect vehicles within the video images. The Michalopoulos et al. system detects vehicles by analyzing the energy, intensity or reflectivity of every pixel in the predefined detection lines and comparing an instantaneous image at every pixel with a threshold derived from analysis of the background scene without the presence of any vehicles.

Other systems have utilized edge detection for detecting vehicles. These systems often perform "blob analysis" on the raw image, which constitutes a grouping of elements. The goal of such an analysis is determining which pixels belong together, based on pixel location, intensity and previous grouping decisions. The basic process may be described as region growing. First, the system picks a center pixel that it determines belongs in a grouping. Then, the system looks to neighboring pixels and determines whether to include the pixels in the grouping. This process continues for each included pixel. Blob detector of this type have run into difficulties because all the decisions are interdependent. Once the system has made initial decisions to include or exclude pixels, subsequent decisions will be based on the decisions already made. Thus, once the system makes an incorrect decision, future decisions are often also incorrect. This series of incorrect decision making may lead to failure of proper convergence. The same is true of edge detection based systems which rely on sequential decision processes.

A further desirable capability of machine vision systems is the capability to track the detected vehicles. Systems that track vehicles usually share some common characteristics. First, the system must identify the starting point of the track. The system may do this by detecting the vehicle by comparing an input image with a background image and judging objects having an area within a predetermined range as vehicles. Other systems perform motion detection to initiate the tracking sequence. Those systems using motion alone to initiate tracking are prone to errors because they must set some baseline amount of motion to initiate tracking. Thus, it is always possible for systems to fail to track slow moving or stalled vehicles.

After identifying a starting point, the systems perform a searching sequence. The systems have a current vehicle location, initially, the starting point. Then they look for potential displacement locations. The systems compare the potential displacement locations and select the location with the greatest suitability. They determine suitability by extracting a subimage region surrounding the current track location. Then, they displace the entire subimage region to potential new locations on the subsequent image frame. Thus, the systems perform a displacement of location and time. The systems perform a pixel-by-pixel correlation to determine which location's image best "matches" the previous location's image. This type of correlation runs into limitations because the system treats the background pixels the same as the pixels of the moving vehicle, thereby causing problems with matching. Further, since all pixel intensities are weighted equally in importance, large areas of uniformity, such as the hood of a vehicle, are redundant. In such areas of uniformity, the system will be able to match a majority of pixels, but still may not line up the boundaries of the vehicle. While the edges of the vehicle constitute a minority of the pixels, they are the pixels that are most important to line up.

Traffic detection, monitoring and vehicle classification and tracking all are used for traffic management. Traffic management is typically performed by a state Department of Transportation (DOT). A DOT control center is typically located in a central location, receiving video from numerous video cameras installed at roadway locations. The center also receives traffic information and statistics, from sensors such as inductive loop or machine vision systems. Traffic management engineers typically have terminals for alternately viewing video and traffic information. They scan the numerous video feeds to try to find "interesting scenes" such as traffic accidents or traffic jams. It is often difficult for traffic management engineers to locate a particular video feed which has the most interesting scene because they must perform a search to locate the video line containing the video feed with the interesting scene. Current traffic management systems also generate alarms based on inferred trends, which tell the traffic management engineers the location of a potentially interesting scene. Because the systems infer trends at a location, the systems require time for the trend to develop. Thus, a delay is present for systems which infer trends. After such delay, the traffic management engineers can then switch to the correct video feed.

SUMMARY OF THE INVENTION

To overcome the limitations in the prior art described above, and to overcome other limitations that will become apparent upon reading and understanding the present specification, the present invention provides a method and apparatus for classifying and tracking objects in an image. The method and apparatus disclosed can be utilized for classifying and tracking vehicles from a plurality of roadway sites, the images from the sites as provided in real-time by video cameras. The images from the real-time video are then processed by an image processor which creates classification and tracking data in real-time and sends the data to some interfacing means.

The apparatus of the present invention includes a plurality of video cameras situated over a plurality of roadways, the video cameras filming the sites in real-time. The video cameras are electrically interconnected to a switcher, which allows for manual or automatic switching between the plurality of video cameras. The video is sent to a plurality of image processors which analyze the images from the video and create classification and tracking data. The classification and tracking data may then be sent to a workstation, where a graphical user interface integrates the live video from one of the plurality of video cameras with traffic statistics, data and maps. The graphical user interface further automatically displays alarm information when an incident has been detected. The classification and tracking data may further be stored in databases for later use by traffic analysts or traffic control devices.

The present invention provides for a method for classifying vehicles in an image provided by real-time video. The method first includes the step of determining the magnitude of vertical and horizontal edge element intensities for each pixel of the image. Then, a vector with magnitude and angle is computed for each pixel from the horizontal and vertical edge element intensity data. Fuzzy set theory is applied to the vectors in a region of interest to fuzzify the angle and location data, as weighted by the magnitude of the intensities. Data from applying the fuzzy set theory is used to create a single vector characterizing the entire region of interest. Finally, a neural network analyzes the single vector and classifies the vehicle.

After classification, a vehicle can further be tracked. After determining the initial location of the classified vehicle, potential future track points are determined. Inertial history can aid in predicting potential future track points. A match score is then calculated for each potential future track point. The match score is calculated by translating the initial location's region onto a potential future track point's region. The edge elements of the initial location's region are compared with the edge elements of the future track point's region. The better the edge elements match, the higher the match score. Edge elements are further weighted according to whether they are on a vehicle or are in the background. Finally, the potential future track point region with the highest match score is designated as the next track point.

BRIEF DESCRIPTION OF THE DRAWINGS

In the drawings, where like numerals refer to like elements throughout the several views.

DETAILED DESCRIPTION OF THE PREFERRED EMBODIMENT

In the following detailed description of the preferred embodiment, reference is made to the accompanying drawings which form a part hereof, and in which is shown by way of illustration of a specific embodiment of which the invention may be practiced. It is to be understood that other embodiments may be utilized and structural changes may be made without departing from the scope of the present invention.

Figure 1:
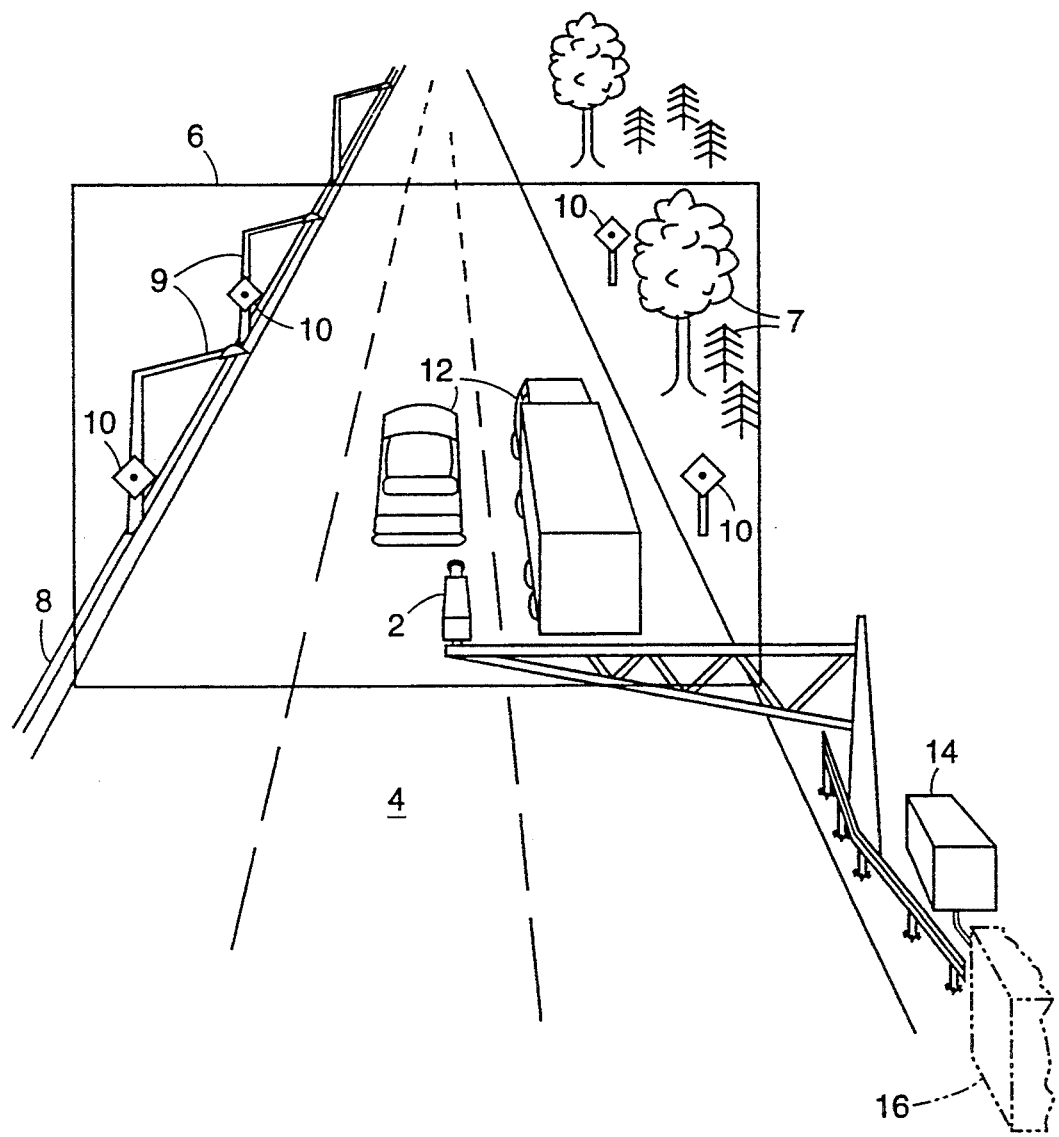
'FIG. 1 is a perspective view of a typical roadway scene including a mounted video camera of the present invention.

The fundamental component of information for machine vision systems is the image array from a scene of a specific section of roadway as provided by video. FIG. 1 illustrates a scene where video camera 2 is positioned above roadway 4 viewing scene 6. Scene 6 contains various stationary items such as trees 7, barrier 8, light poles 9 and position markers 10. Scene 6 also may contain moving objects such as vehicles 12. Video camera 2 is electrically coupled, such as by electrical or fiber optic cables, to electronic processing equipment 14 located locally, and further transmits information to centralized location 16. Video camera 2 can thereby send real-time video images to centralized location 16 for use such as viewing, processing, analysis or storage.

Figure 2:
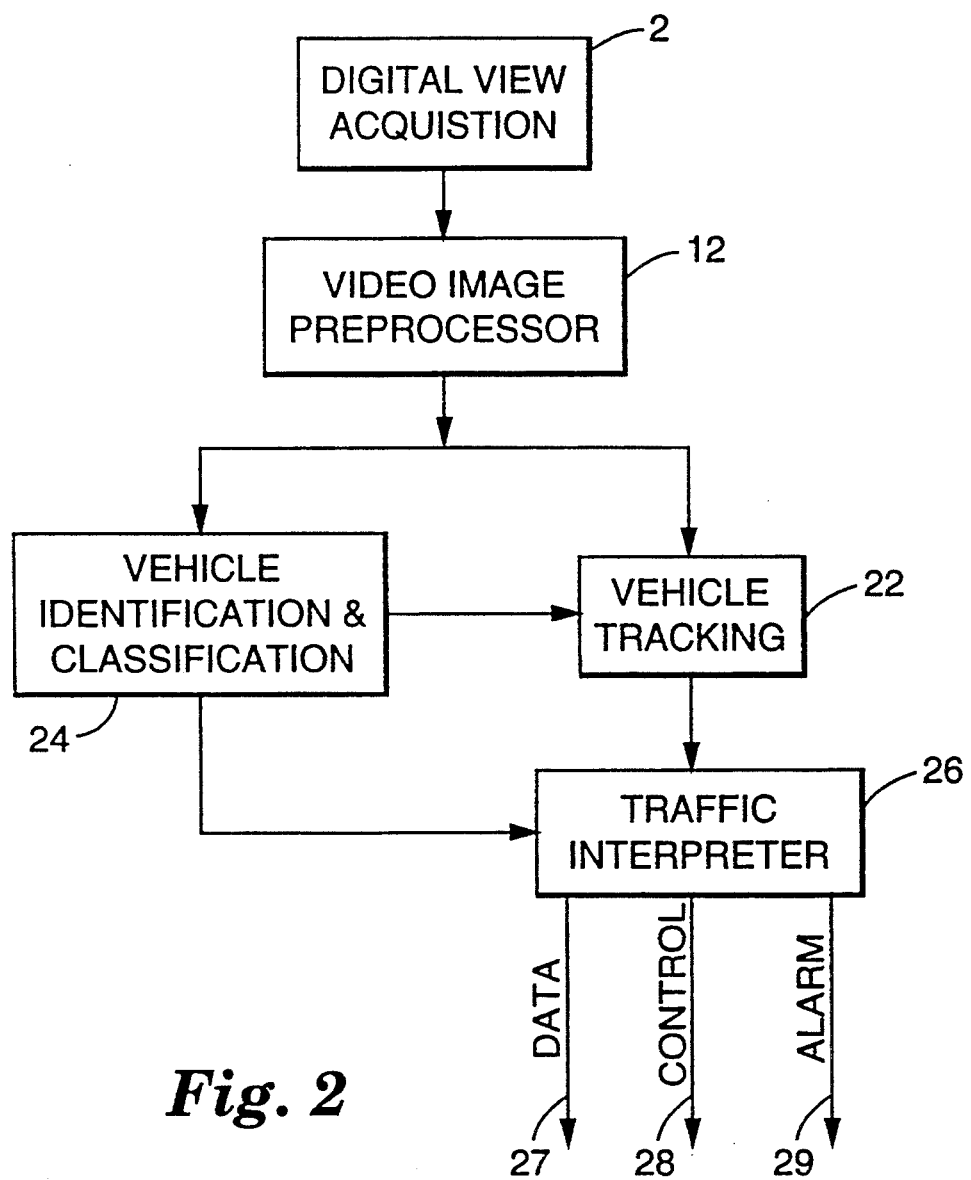
FIG. 2 is a block diagram of the modules for an embodiment of the classification and tracking system of the present invention.

Image information in the form of digitalized data for each pixel of an electronic video image of scene 6 is processed according to the flow diagram as illustrated in FIG. 2. For example, the image array may be a 512×512 pixel three color image having an integer number defining intensity with a definition range for each color of 0-255. If image information is not in digitized form, video image preprocessor module 12 will digitize the image information. The camera image input is subject to environmental effects including roadway vibration, wind, temperature change and other destabilizing factors. To counter the undesirable effects of camera motion, video image preprocessor module 12 electronically performs image stabilization. Reference markers 10 are mounted within the view of video camera 2. Using frame to frame correlation with respect to reference markers 10, compensating translation and rotation is calculated. The appropriate warping of the image may be performed in real time by machines such as Datacube Corporation's (Danvers, Mass.) "Miniwarper". Video image preprocessor 12 may then calibrate the stabilized video image information by mapping the real world measurements of the image to the pixel space of the image. Video image preprocessor 12 may further perform background subtraction, eliminating any image information not associated to a vehicle. Thus, the image is segmented into vehicle related pixels and nonvehicle/background pixels. A preferred embodiment of a method and apparatus for background subtraction for use with the present invention is described in commonly-assigned U.S. patent application entitled "Method and Apparatus for Background Determination and Subtraction for a Monocular Vision System" and identified by attorney docket number 49805USA1A, filed on even date herewith and now U.S. patent application Ser. No. 08/163,422 now pending.

Vehicle identification and classification module 24 and vehicle tracking module 22 then process the stabilized video image information. Vehicle identification and classification may be used for vehicle tracking or may be directly output as data for further analysis or storage. The results of vehicle classification module 24 and vehicle tracking module 22 are consolidated in traffic interpreter 26, which may include a user interface and the system central processing unit. Results of the image processing are then available for other modules, such as traffic data module 27, control module 28, or alarm information module 29 which signals abnormalities in the scene.

Figure 3:
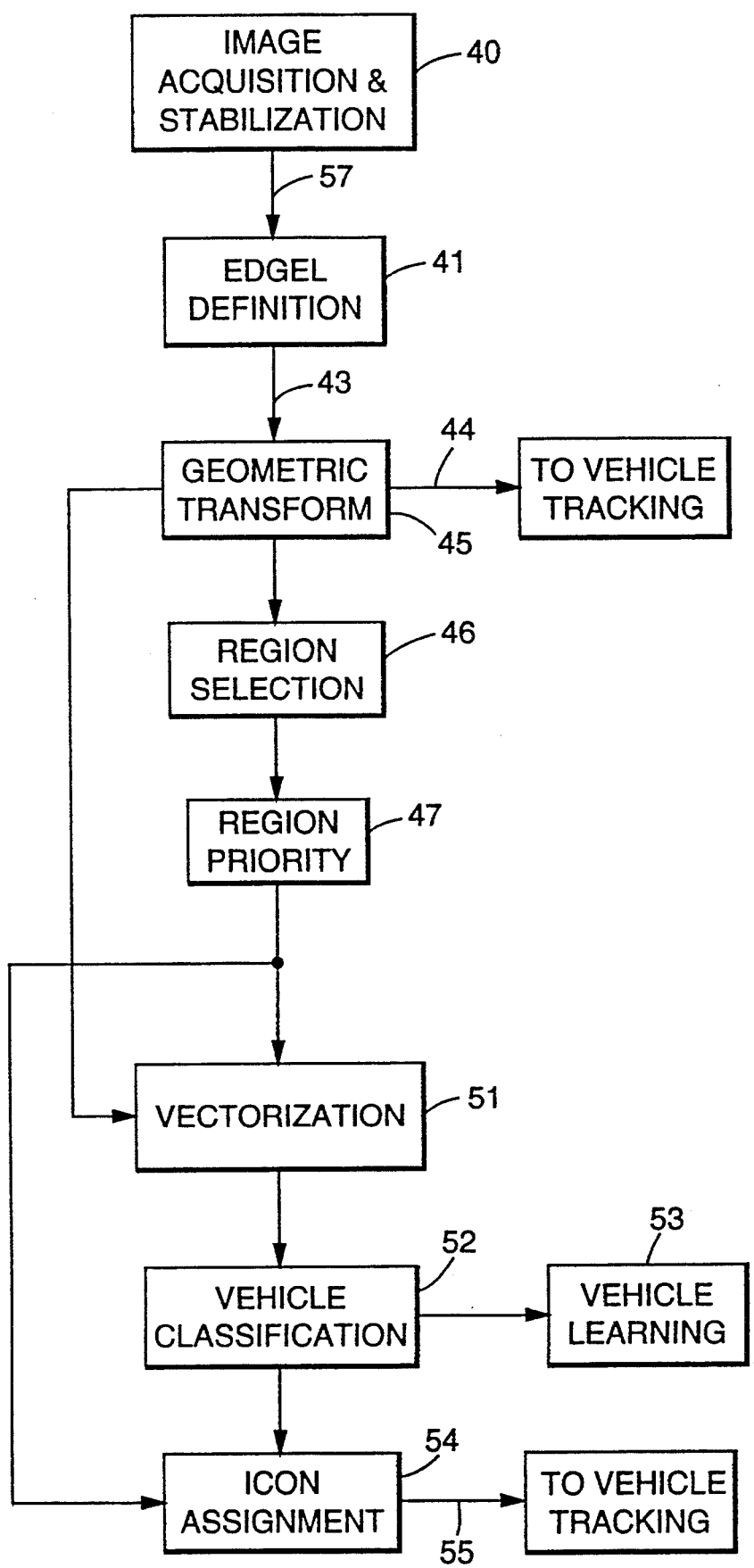
FIG. 3 is a flow diagram of the steps for classifying a vehicle.

FIG. 3 is an image processing flow diagram of the data flow for vehicle classification. At module 40, the video image is digitized and stabilized, eliminating noise due to vibration and other environmental effects for a discrete image array a at time $t_a$. The discrete image array a may consist of a matrix of numbers, such as a 512×512 pixel image having a integer defining the intensity of each pixel, with a definition range for each color of 0-255. Successive image arrays would be a+1 at $timet_{(a+1)}$ etc.

At edgel definition module 41, each pixel of the image array output from the stabilized image is evaluated for the magnitude of its edge element (edgel) intensity. Edgel intensity indicates the likelihood that a given pixel is located on some edge having particular orientation and contrast. The greater the contrast between a particular pixel and the pixels surrounding it in a particular orientation, the greater the edgel intensity. An edge differs from an edgel in that an edge is a more global phenomena involving many edgels. Edgel definition module 41 takes the data of the image array and produces two edgel images for each pixel. A first edgel image represents the likelihood that each pixel lies on a horizontal edge, or the degree of horizontal edgeness at each pixel, x_edgel, calculated according to equation 1.

$$x\_edgel_{ij} = \sum_{u,v=-k}^{+k} \left( \frac{\text{sign}(v)}{2\pi\sigma^2} e^{-(u^2+v^2)/2\sigma^2} \right) * I_{(i+u)(j+v)} \quad \text{Equation 1}$$

Within equation 1, sign(v) is +1 when v is positive and −1 when v is negative, $I_{(i+u)(j+v)}$ are the pixel intensities surrounding pixel (i,j) and the kernel is of size 2k+1 by 2k+1 where k is equal to two in one embodiment of the system. The second image represents the likelihood that a pixel lies on a vertical edge, or the degree of vertical edgeness, y_edgel, calculated according to equation 2.

$$x\_edgel_{ij} = \sum_{u,v=-k}^{+k} \left( \frac{\text{sign}(u)}{2\pi\sigma^2} e^{-(u^2+v^2)/2\sigma^2} \right) * I_{(i+u)(j+v)} \qquad \text{Equation 2}$$

Within equation 2, sign(u) is +1 when u is positive and −1 when u is negative. Therefore, edgel detection module 41 determines the likelihood that each pixel within the image array lies on a horizontal or vertical edge.

Figure 4:
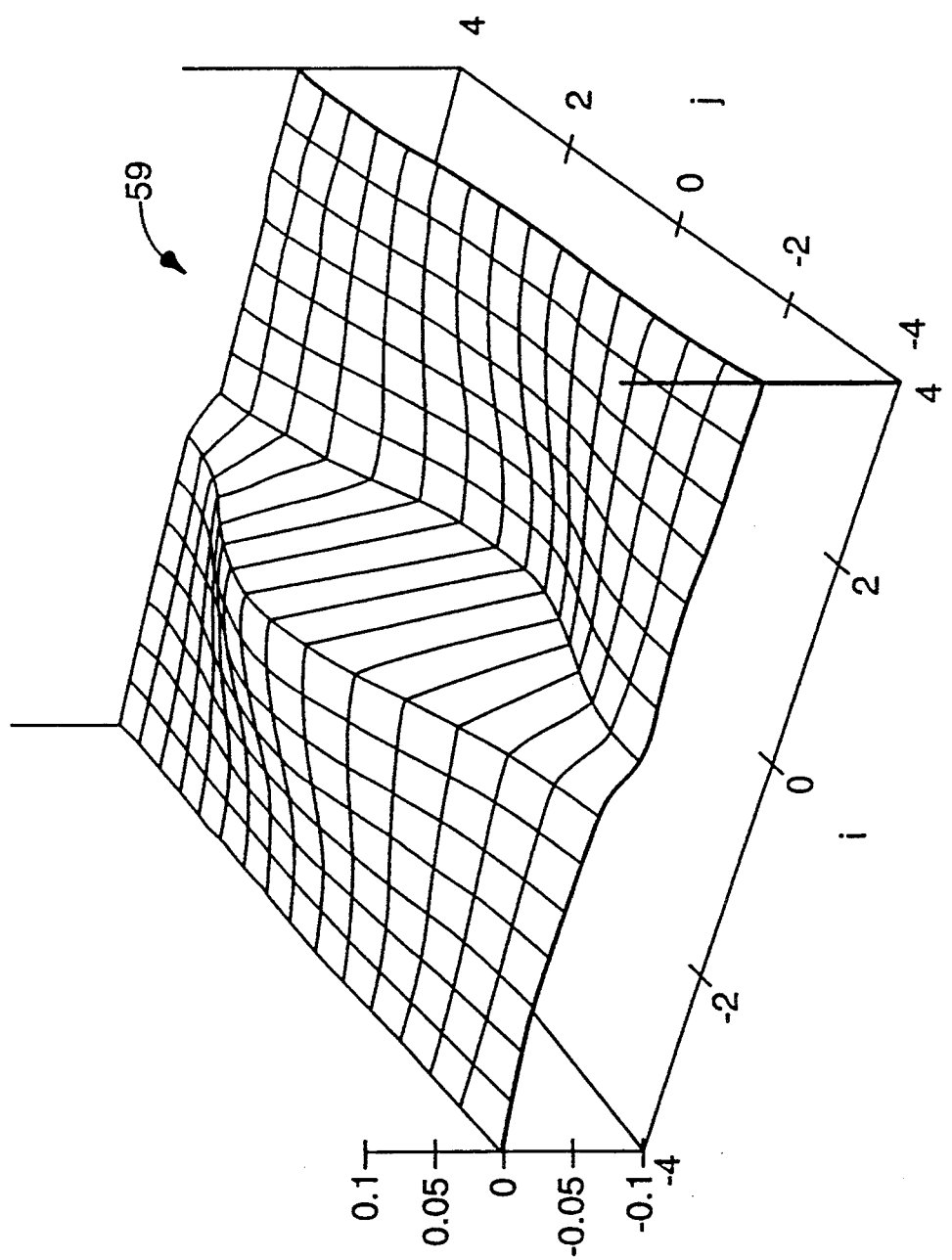
FIG. 4 is a top-view of a kernel element used in the classification process.

FIG. 4 shows a plot of a sample 8×8 kernel used to calculate edgel intensities. Edgel detection module 41 successively applies kernel 59 to each pixel within the image array to perform convolution. The convolution takes into account the pixels surrounding the pixel in question, thereby determining the likelihood that the pixel in question is located on an edge. Edgel detection module 41 replaces the original pixel value with the outputs from applying kernel 59 twice in two orientations, resulting in two new integers representing both the horizontal and vertical edgeness of the pixel.

Edgel definition module 41 sends forward the horizontal edgeness data (x_edgel) and vertical edgeness data (y_edgel) of the array a to geometric transform module 45. Geometric transform module 45 converts the discrete pixel data pairs (x_edgel,y_edgel) from degree of horizontal edgeness and vertical edgeness values to a vector with direction and magnitude for each pixel (i,j). The direction may be expressed in angle format while the magnitude may be expressed by an integer. In a preferred embodiment, the angle is between 0–180 degrees while the intensity may be between 0–255. The transform of data is analogous to transforming rectangular coordinates to polar coordinates in a Euclidean space. The geometric transform is performed, in a preferred embodiment, according to equations 3 and 4. The magnitude value is a calculation of total edgel intensity (sum_edgel) of each pixel, and is calculated according to equation 3.

$$\text{sum\_edgel}_{ij} \equiv |x\_edgel_{ij}| + |y\_edgel_{ij}| \qquad \text{Equation 3}$$

The angle value α developed in geometric transform module 45 for pixel i,j is calculated according to equation 4.

$$\alpha_{ij} \equiv \phi \text{ if } y\_edgel_{ij} = \phi \qquad \text{Equation 4}$$

$$\alpha_{ij} \equiv \frac{90}{1 + \frac{x\_edgel_{ij}}{y\_edgel_{ij}}} \text{ if } \frac{x\_edgel_{ij}}{y\_edgel_{ij}} \geq \phi,$$

$$\alpha_{ij} \equiv 180 - \left( \frac{90}{1 + \frac{x\_edgel_{ij}}{y\_edgel_{ij}}} \right) \text{if } \frac{x\_edgel_{ij}}{y\_edgel_{ij}} < \phi$$

The angle and magnitude data is then sent to region selection module 46. Geometric transform module 45 also may send forward the magnitude data representing the pixel intensity to a vehicle tracking module.

Figure 5:
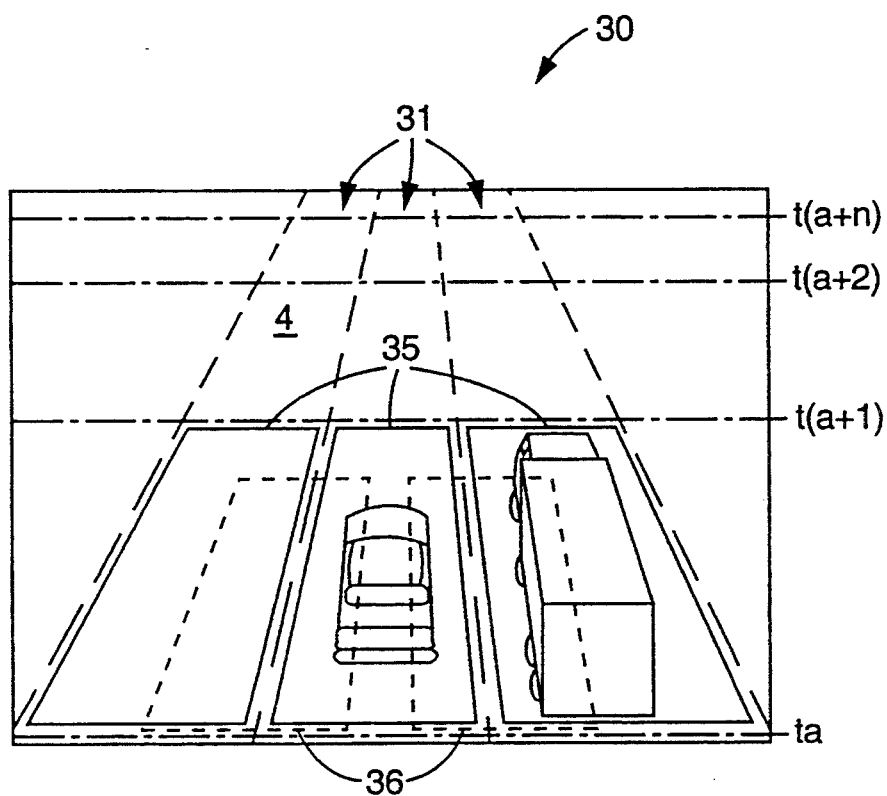
FIG. 5 is a graphical representation of an image of a scene, illustrating the placement of potential regions of interest.

Region selection module 46 must define potential regions of interest, or candidate regions, for classification. Referring to FIG. 5, image 30 includes roadway 4 and roadway boundaries 31. Region selection module defines candidate regions 35. Each vehicle class is assigned a set of appropriately sized and shaped regions. In a preferred embodiment, candidate regions are substantially trapezoidal in shape, although other shapes may be used. Candidate regions may be dynamically generated according to prior calibration of the scene. Regions of interest are overlapped within the image space. In a preferred embodiment, overlapping regions are confined to the lower half of the image space. In the illustrated example, the candidate regions of interest are truck sized trapezoids, with some centered in the traffic lanes and others centered on the lane marker overlapping the traffic lanes. The number of overlapping trapezoids may vary, depending on the coverage preferred. Another set of overlapping trapezoids 36 could be, for example, car sized. Classification regions may be predefined.

Region selection module 46 scans the predefined regions of interest to determine presence of vehicles, selecting regions for analysis based on a minimum threshold of change in the average edgel value within a candidate region. The minimum threshold value only need be high enough such that changes in average edgel intensity will not rise above the threshold value due to noise within the region. Region selection module sums the individual sum_edgel values for all of the pixels for each candidate region and calculates an average sum_edgel value. Region selection module 46 then compares the candidate regions of array a with the regions of frames a−1 and a+1, which are the previous and subsequent frames. The average sum_edgel value is compared to the like average sum_edgel value for the previous and subsequent frames. When comparison indicates that a local maximum for the sum_edgel value has been reached, or local minima, if some different criteria is used, the candidate region becomes a region of interest. Once a region of interest has been identified, the region priority module 47 selects the region of interest and sends it forward for vehicle identification by class.

While the data available would be sufficient for classification purposes, the amount of data is too voluminous for real-time processing. Further, there is great redundancy in the data. Finally, the data has too little invariance in both translation and rotation. Therefore, the system of the present invention reduces the amount of data, reduces the redundancy and increases the invariance of the data by applying fuzzy set theory. Vectorization module 51 converts the geometrically transformed data to vector data by applying fuzzy set theory to the transformed data. Vectorization module 51 may apply separate fuzzy set operators on both the location and the angular characteristics of each geometrically transformed edgel. Vectorization module 51 determines a vector which characterizes the entire region of interest, the vector which contains sufficient information for classification of any vehicle within such region.

Figure 6A:
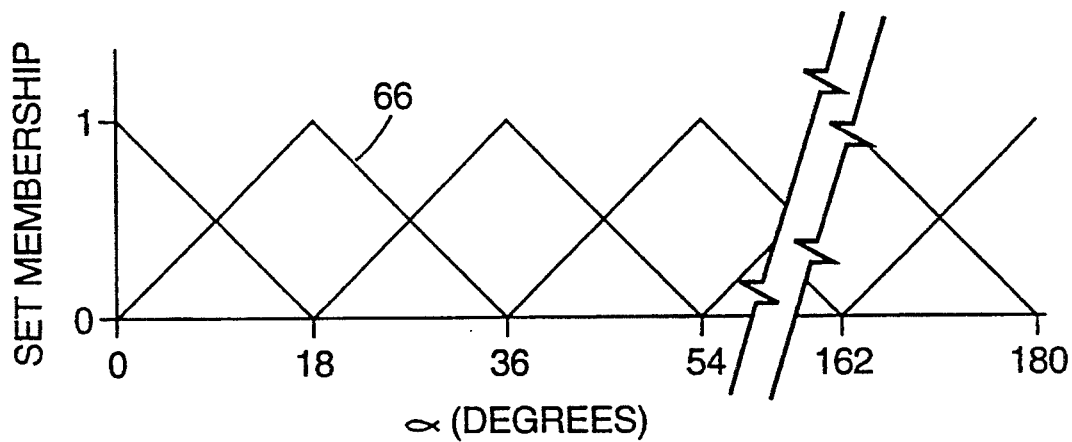
FIG. 6A and 6B are graphs used to describe the angle fuzzy set operator.
Figure 6B:
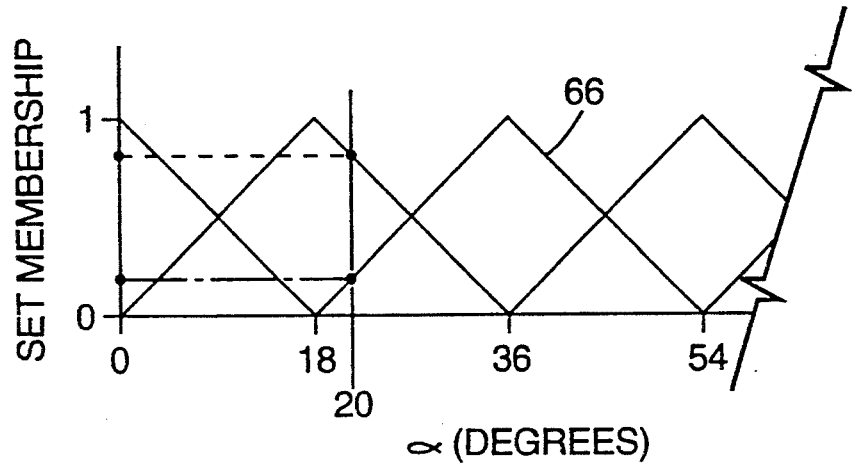

In a preferred embodiment of the classification process, vectorization module 51 applies ten overlapping wedge-shaped operators 66, as shown in FIG. 6A, to the angle components of the geometrically transformed edgels for angle fuzzification. Each wedge-shaped operator 66, has a width of 36 degrees and a unit height. When overlapping wedge-shaped operators 66 are applied to the angle components of each edgel, operators 66 determine to what extent the angle should "count" toward each angle set. Each wedge-shaped operator is centered at a particular angle. For each angle component not falling directly under the apex of a wedge, i.e. at an angle that a wedge is centered at, then the angle will be counted toward both wedges it falls under, taking into account which angle that each wedge is centered at is more like the angle component as well as the magnitude of the intensity of the edgel. For example, an angle centered exactly at 18 degrees will have full set membership in the angle set centered at 18 degrees. On the other hand, for the 20 degree angle shown in FIG. 6B, the angle will count more towards the angle set centered at 18 degrees and less towards the angle set centered at 36 degrees. After applying this fuzzy logic operator to all the angle components of the edgels in the region of interest, the resulting output is ten angle sets representing all the angle components of the geometrically transformed edgels.

Figure 7A:
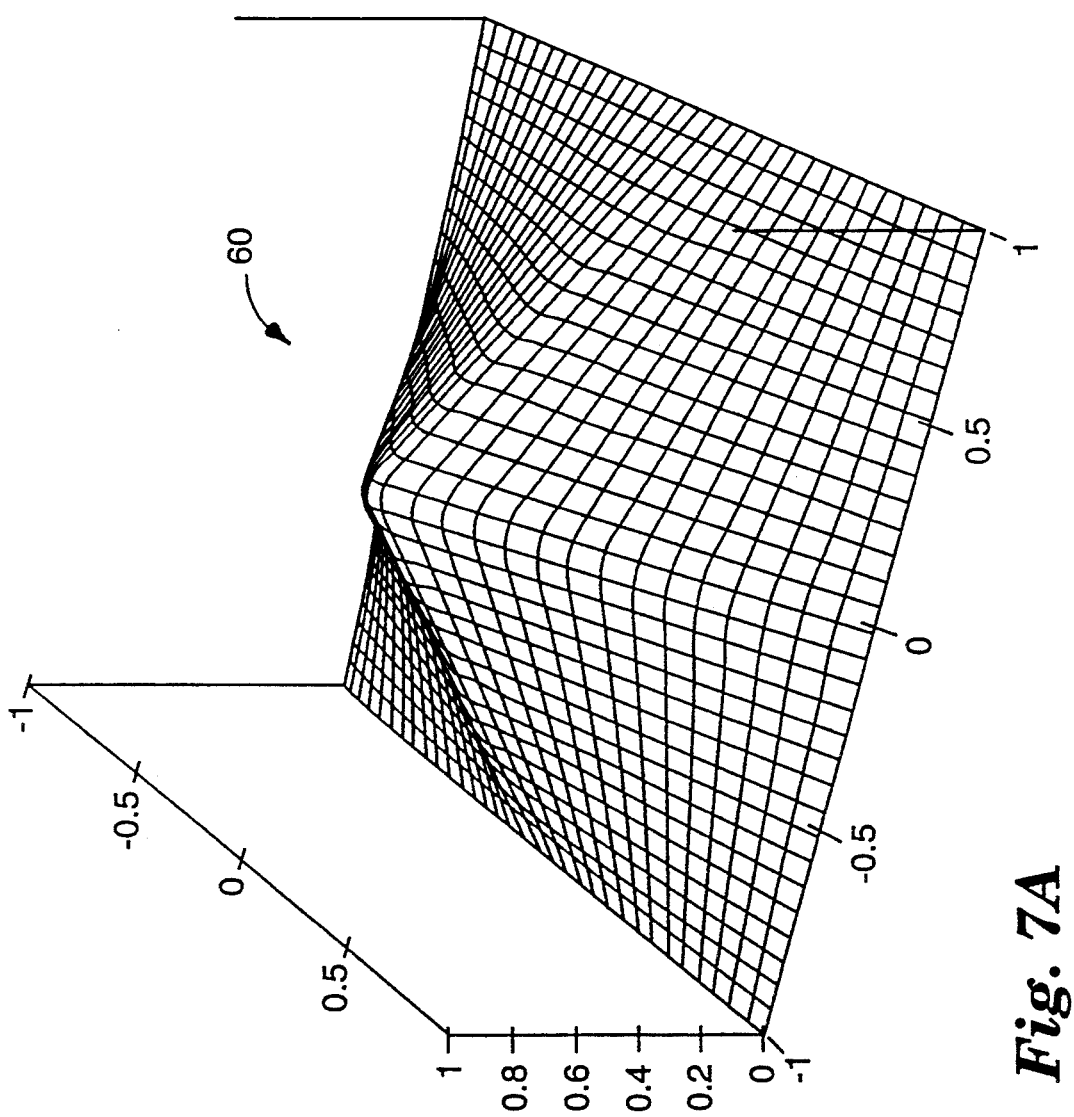
FIG. 7A is a top-view of a location fuzzy set operator as used in a preferred embodiment.
Figure 7B:
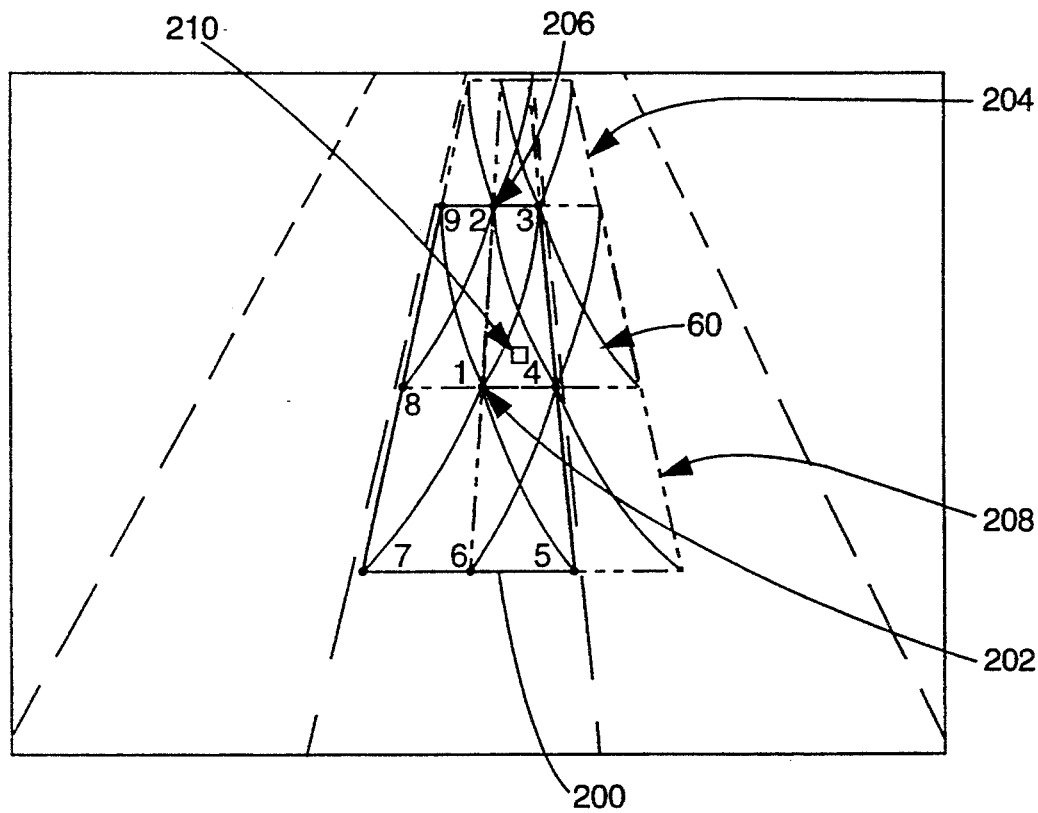
FIG. 7B illustrates the placement of location fuzzy set operators with respect to the region of interest.

While wedge-shaped operator 66 fuzzifies the angle characteristics of the edgels, the location of the angles of each edgel still must be taken into account. Thus, a location fuzzy set operator must be applied to the region of interest to determine the general location of the angle components of the edgels. In a preferred embodiment, tent function 60, as shown in FIG. 7A, is used as the fuzzy set operator for location. The tent function 60 has a unit height. Tent function 60 performs a two dimensional fuzzification of the location of the edgels. The input variables (i,j) represent the pixel's location within the region of interest. FIG. 7B illustrates placement of tent functions 60. For each region of interest 200, nine tent functions 60 are placed over region of interest 200. Center tent function 202 is centered over region of interest 200 and entirely covers region of interest 200. Top-right tent 204 is centered on the top-right corner of center tent 202. Top-center tent 206 is centered on the top-center edge of center tent 202. Right-center tent 208 is centered on the right-center edge of center tent 202. Top-left tent, left-center tent, bottom-left tent, bottom-center tent, and bottom-right tent are similarly placed. (Not shown in FIG. 7B). At any point within region of interest 200, the sum of the heights of all overlapping tents is the unit height.

The tent functions are applied to each edgel within the region of interest. For each tent function a histogram is produced which records the frequency that a range of angles occurs, as weighted by the intensity of the edgels, within a particular tent function. For edgel 210, the histograms for center tent 200, top-center tent 206, top-right tent 204 and right-center tent 208 will all "count" some portion of edgel 210, as determined by the height of each tent over edgel 210. After determining what proportion of edgel 210 is located under each tent, the angle sets associated with edgel 210, as determined by the wedge-shaped fuzzy set operators, determine which angle range within the histogram the edgel value must be counted. Then, the edgel value is weighted by the magnitude of the edgel intensity, as calculated in geometric transform module 50, and counted in each histogram associated with the tent functions the edgel falls under. This process is repeated for all edgels within region of interest. The result of the location fuzzification is nine histograms, each characterizing the frequency that ranges of angles are present, as weighted by magnitude, for a general location. Each histogram is a vector of dimension 10. The nine location histograms are then strung together to form a vector of dimension 90, which is output from vectorization module 51.

Figure 8:
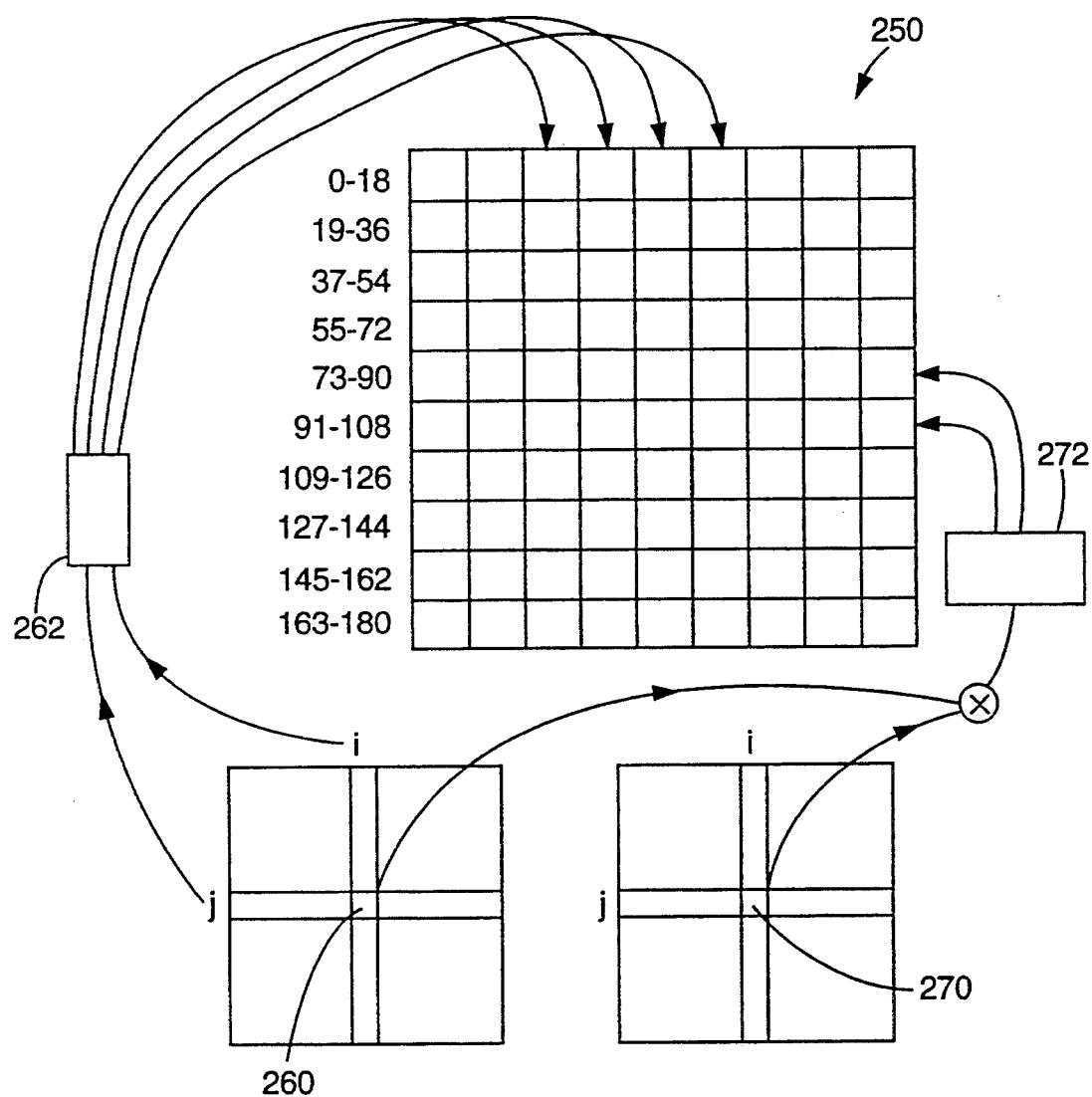
FIG. 8 illustrates the process of organizing information from location and angle fuzzy set theory in matrix form.

In another embodiment of the present invention, a 10×9 matrix may be used instead of histograms for the fuzzification process. In this embodiment, each pixel is evaluated and proportionally allocated to positions within the matrix. In FIG. 8, matrix 250 is shown. Matrix 250 has ten rows, representing ten angle sets of 18 degrees each, and nine columns, representing nine tent locations, such as center tent, top-right tent, etc. A pixel at location (i,j) is evaluated for its angle 260 and its magnitude 270. After the location of pixel (i,j) is subjected to the tent functions 262 for location fuzzification, the location is allocated to up to four columns of matrix 250, depending on the number of tent functions pixel (i,j) falls under. Angle 260 is then weighted by magnitude 270 of pixel (i,j) and subjected to wedge shaped operator 272 for angle fuzzification. The angle, as weighted by magnitude, is allocated up to two adjacent rows of matrix 250, depending on the number of wedge-shaped operators angle 260 falls under. This process is repeated for all pixels and the nine columns are placed end-on-end to create a vector of dimension 90, which is output from vectorization module 51.

Vehicle classification module 52 includes a neural network. The neural network is trained to recognize predetermined classes of vehicles by vehicle learning module 53. The vector of dimension 90, as developed in vectorization module 51 is evaluated by the neural network. The neural network then classifies the vehicle based on the vector and may generate a signal indicative of the classification of the vehicle. A preferred embodiment of a neural network for use with the present invention is described in commonly-assigned U.S. patent application entitled "Facet Classification Neural Network" and identified by attorney docket number 49597USA4A, filed on even date herewith and now U.S. patent application Ser. No. 08/163,825 now pending.

Figure 9:
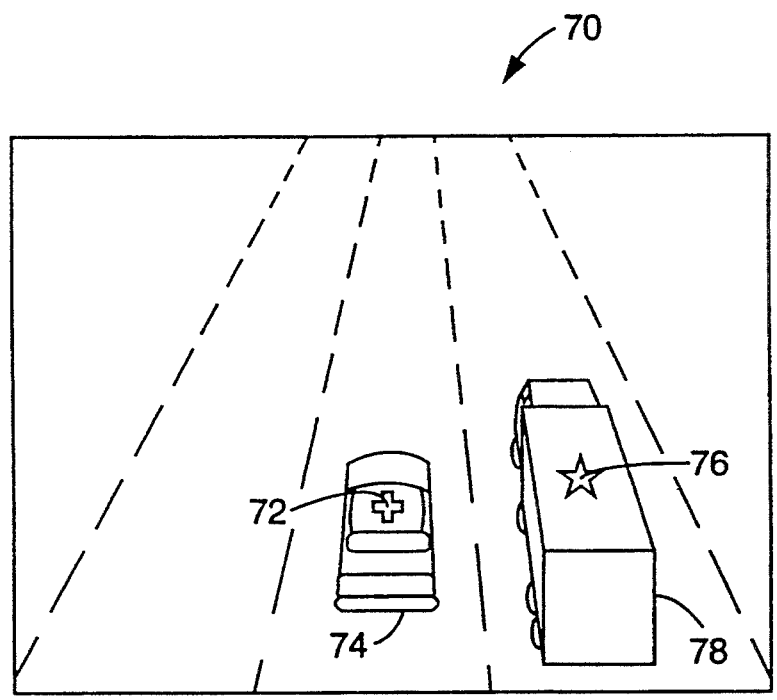
FIG. 9 illustrates the placement of icons on classified vehicles.

A unique icon identifying the vehicle class may be assigned to a classified vehicle in icon assignment module 54. The icon assignment further may be output to the tracking module for facilitating visual tracking. Assignment of definitive classification icons to the individually classified vehicles provides unique visual output for oversight of system operation and specific identification for tracking. FIG. 9 is one frame of the visual image scene 70 cross shaped icon 72 located on car image 74 and star shaped icon 76 on truck image 78. Any icon may be chosen for identification, such as the characters "T" for trucks and "C" for cars. These icons will move with progression of the vehicle as the track progresses over time through multiple frames until the vehicle is no longer identifiable in the scene.

After detection and the associated classification of a vehicle, the portion of the video image containing the identified vehicle takes on a unique identity within the array a for time $t_a$. The unique identity includes dynamic region-of-interest boundaries, pixel data computations within those boundaries and assignment of the appropriate icon. A display of the video image may include the icon on the video screen of the user interface, if the user desires, and will be displayed centrally located within the assigned boundaries. In subsequent images, arrays (a+1),(a+2) ... (a+n) for times $t_{(a+1)}$, $t_{(a+2)}$ ... $t_{(a+n)}$ will develop the track of the vehicle. The tracking sequence will continue until the vehicle reaches a predetermined row of the array.

Figure 10:
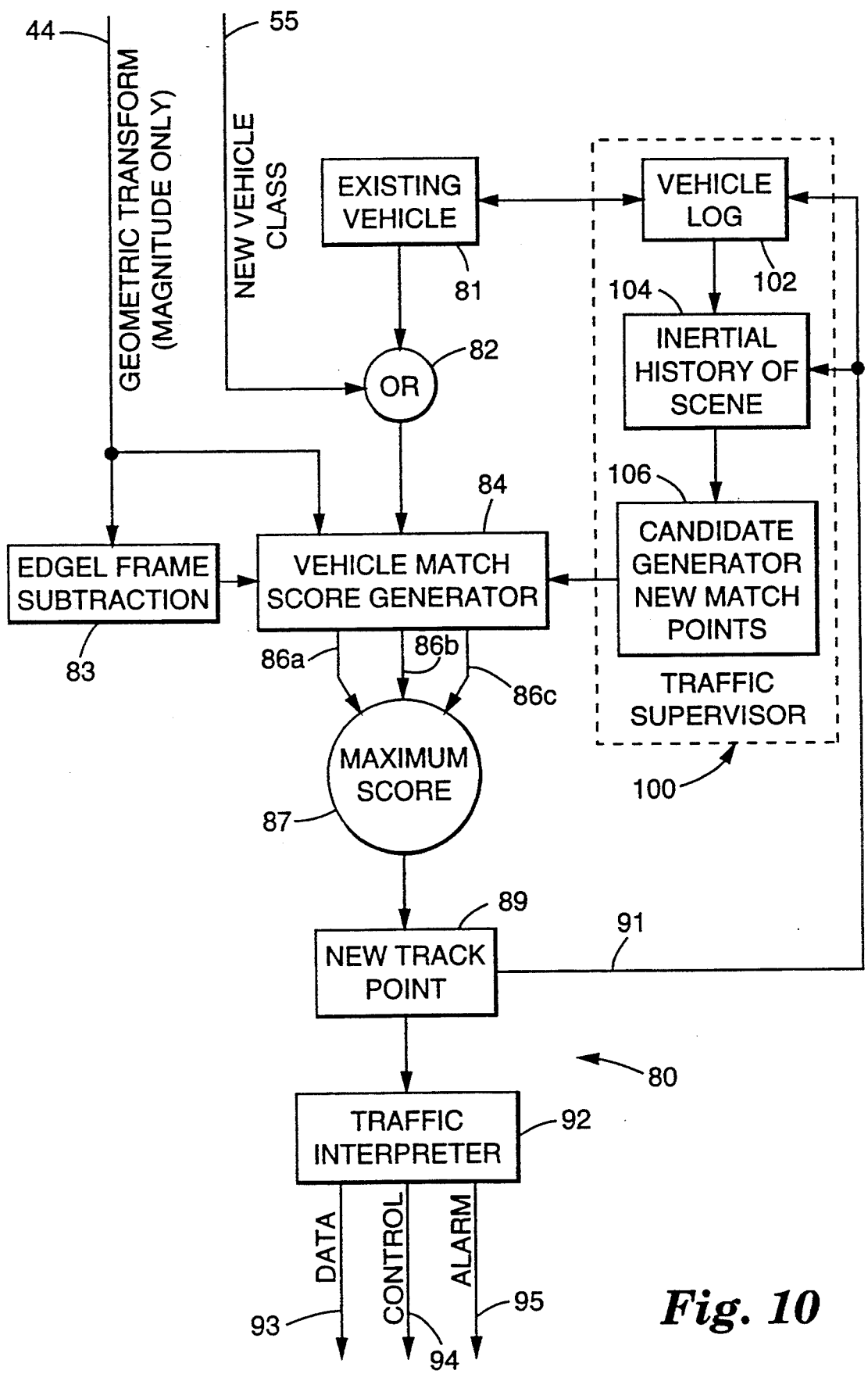
FIG. 10 is a flow diagram of the steps for tracking a vehicle.

Referring to FIG. 10, a flow diagram for vehicle tracking is shown. Selected modules of the tracking sequence receive information from modules from the classification process, as shown in FIG. 4, including: edgel intensities from geometric transform module 45 and vehicle identification and classification data 55.

The tracking process starts with identification of a vehicle within the scene. Thus, at the initiation of the process or after a lull in traffic, existing vehicle module 81 will have no identified vehicles in memory. If the classification process has identified a vehicle in frame a at time $t_a$, it is fed forward as a new vehicle 55 to decision node 82. When decision node 82 receives information relating to a new vehicle, it generates a new tracking sequence for the new vehicle. Once a tracking sequence has been established for a vehicle, decision node 82 processes the identified vehicle's track according to information from existing vehicle module 81. When decision node 82 receives new vehicle information, as opposed to existing vehicle information from existing vehicle module 81, a new vehicle initialization format is fed forward to vehicle match score module 84. Alternatively, where decision node 82 feeds forward information on an existing vehicle, the existing vehicle format is matched with information from traffic supervisor module 100.

Traffic supervisor module 100 maintains oversight of the scene, including keeping a vehicle log 102 of all vehicles currently within the scene, including vehicles' associated track histories, inertial history 104 of the scene, accumulated and normalized over time, and potential future track positions of vehicles from candidate generator 106. Once a previous track point, or source track point, has been identified for either a new vehicle or an existing vehicle, candidate generator 106 generates a range of potential future track points, or target track points. While target track points can include any areas in the scene, including areas in front of, to the side of and behind the source track point, in a preferred embodiment, candidate generator 106 takes into account the inertial history of the vehicle, as received from inertial history module 104, to help predict the vehicle's next location. The target regions overlap, the centers of the regions in close proximity, preferably lying only a pixel apart.

Figure 11:
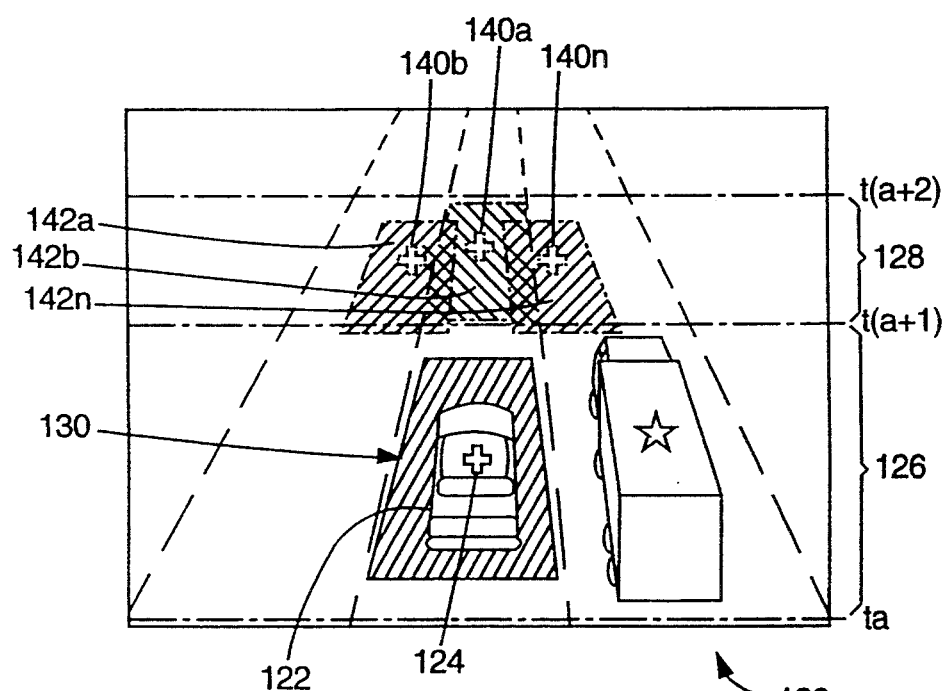
FIG. 11 is a graphical representation of an image of the scene, illustrating the placement of potential future track regions.

An example of the predicted future positions, or target regions, is graphically shown as image 120 in FIG. 11. In the lower part of image 120, source region 130 is shown in time frame $t_a$ 126 which includes identified vehicle 122 marked with the appropriate icon 124. In the upper part of image 120, predicted future track points 140a, 140b and 140n, are shown for time frame $t_{(a+1)}$ 128 with proportionately shrunken track regions 142a, 142b and 142n.

Data reduction is desireable to increase the speed of processing the information for tracking. Reducing the resolution of an region of interest facilitates data reduction. Pixel averaging followed by subsampling is used to reduce resolution. For example, if a 2×2 kernel is used, averaging the pixel intensities of an image over the four pixels in the kernel, the resolution of the target region is reduce by one-quarter. A multiresolution pyramid, with layers of images of decreasing size and resolution, can be created with multiple applications of the kernel. Thus, the target region can be searched for at a lower resolution image to identify areas where the target region is likely located before searching in the same areas in a higher resolution image.

After the target regions have been identified, a match score is calculated for each target region. The source region is overlaid over each target region. The match score takes into account edge elements from the translated source regions that match edge elements from a target region. The better the edge elements match, the higher the match score. Then, edge elements are weighted according to evidence of motion, as determined by the amount the contrast is changing with respect to time at a given pixel, such that vehicle edge elements are maximized and background edge elements are minimized. The target region with the largest match score is the next track point and becomes the new source region. Vehicle match score generator 84 takes as input frame subtraction data 83 which subtracts the magnitude of edgel values from consecutive frames, thereby creating a difference image. Vehicle match score generator 84 also receives target regions from candidate generator 106 in addition to the source region from decision node 82. Vehicle match score generator 84 then calculates a match score for each target region using Equation 5.

$$M = \Sigma[\sqrt{S_k(R_\delta)*R_{\delta,(u,v)}} *(255 - |R_{s,(u,v)} - S_k(R_c)|)] \quad \text{Equation 5}$$

In Equation 5, $R_c$ is the matrix of the current region's magnitude of edge element intensities. $R_{s,(u,v)}$ is the matrix of the subsequent region's magnitude of edge element intensities with translation (u,v) of the region's center. $S_k(R)$ is one of several shrinks of a region R. $R_\delta$ is the current track-region in the difference image. The algorithm proceeds by finding a k and a displacement (u,v) such that the solution M is maximized. Note that the notation is interpreted such that substraction, multiplication, square root, and absolute value are all components-wise over the matrices operated on. $\Sigma$ simply sums all the elements on a given matrix.

Maximum score decision node 87 compares results obtained from match score generator 84. The maximum score from this comparison is identified and the target region may be designated as the new location of the vehicle by new track point module 89. New track point 91 is supplied to traffic supervisor 100 and to the user interface/traffic interpreter 92. In one embodiment of the invention, intermittent tracking can be employed such that new track point module 89 only provides a new track point if a tracked object has moved significantly. New track point module 89 compares the current target region with a reference of the same region from a previous time frame and determines if the difference between them exceeds a threshold value. If it does, then new track point module 89 supplies a new track point at the new location of the vehicle and the reference buffer is updated to hold the contents of the current region of interest. Intermittent tracking increases the signal-to-noise ratio of the data used for tracking, and facilitates tracking in slow or congested traffic conditions. User interface/traffic interpreter 92 can be any of a number of systems, either at the location of the scene or remotely located at a traffic control center. Traffic interpreter 92 can provide output data, traffic control information, or alarms for storage, traffic control, or use by a traffic control system of a manual user.

Figure 12:
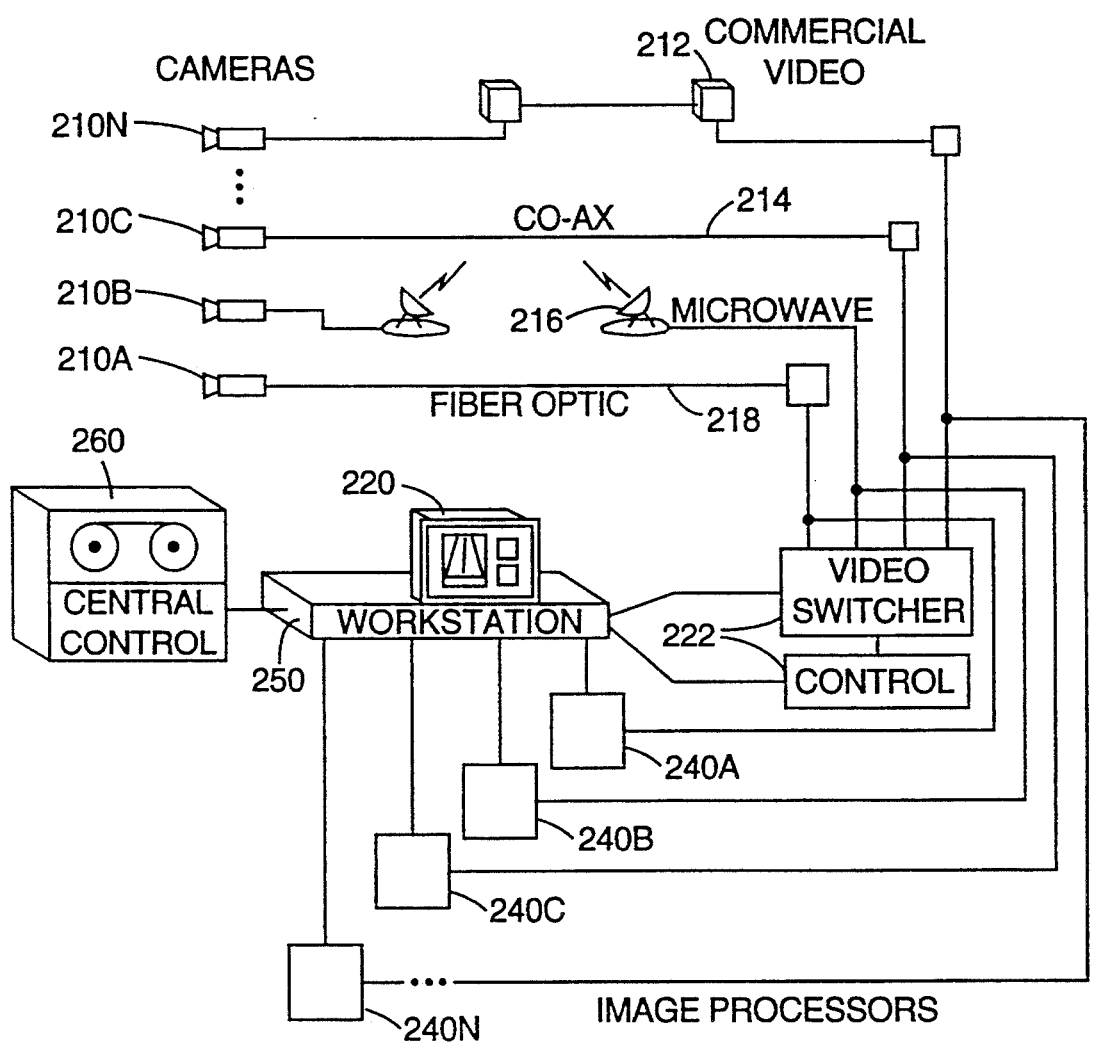
FIG. 12 is a diagram of a preferred embodiment of the system of the present invention.

Referring to FIG. 12, a vehicle classification and tracking system will now be described. While a vehicle classification and tracking system can be used at independent roadway scenes for providing data, traffic control information, or operational alarms, it is particularly useful in monitoring traffic from many roadway sites and integrating the analysis of a large volume of vehicles as they pass through the numerous sites. Video cameras 210A, 210B, 210C, . . . , 210N simultaneously monitor traffic conditions from several roadway sites. Video from the video cameras can be transmitted in a variety of ways such as a commercial network 212, dedicated cable 214, multiplexed in a microwave network 216 or a fiber optic network 218. The video is then processed. In a preferred embodiment, each video camera 210 sends video to a separate image processor 240, although a single image processing means could receive and process the video from all the cameras. Image processors 240A, 240B, 240C, . . . , 240N process the video in real-time and create classification and tracking data. A traffic interpreter may also reside in image processors 240, or in workstation 250, for further generating alarm data, traffic statistics and priority data in real-time. Traffic statistics such as volume, velocity, occupancy, acceleration, headway, clearance, density, lane change count or other characteristics may be computed. Further, traffic statistics may be computed according to lane, vehicle class or both, as well as per interval or over a time period. Image processors 240 then send the data to workstation 250. Video from video cameras 210 is also received by workstation 250 and the live video displayed on display 220. The live video can also be integrated with associated traffic information for a highway site in a single screen display. The live video can be switched from scene to scene with video switcher 222 under manual control of a user watching display 220 or may automatically be switched by the command of workstation 250 in response to alarm data or priority data generated by image processors 240. Video, traffic statistics and other traffic related data may all be stored in databases in workstation 250 or sent to a control center 260 for storage and later use, such as studying traffic patterns.

Figure 13:
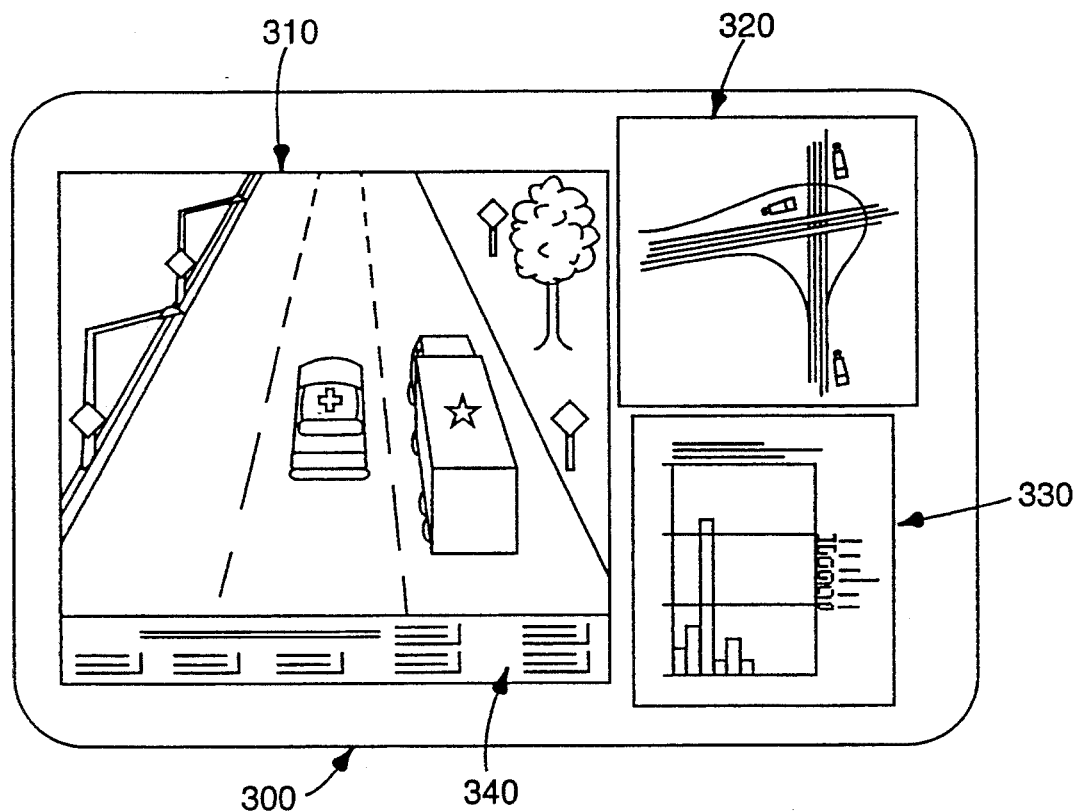
FIG. 13 is a graphical representation of an image displayed by the monitor of a graphical user interface.
Figure 14:
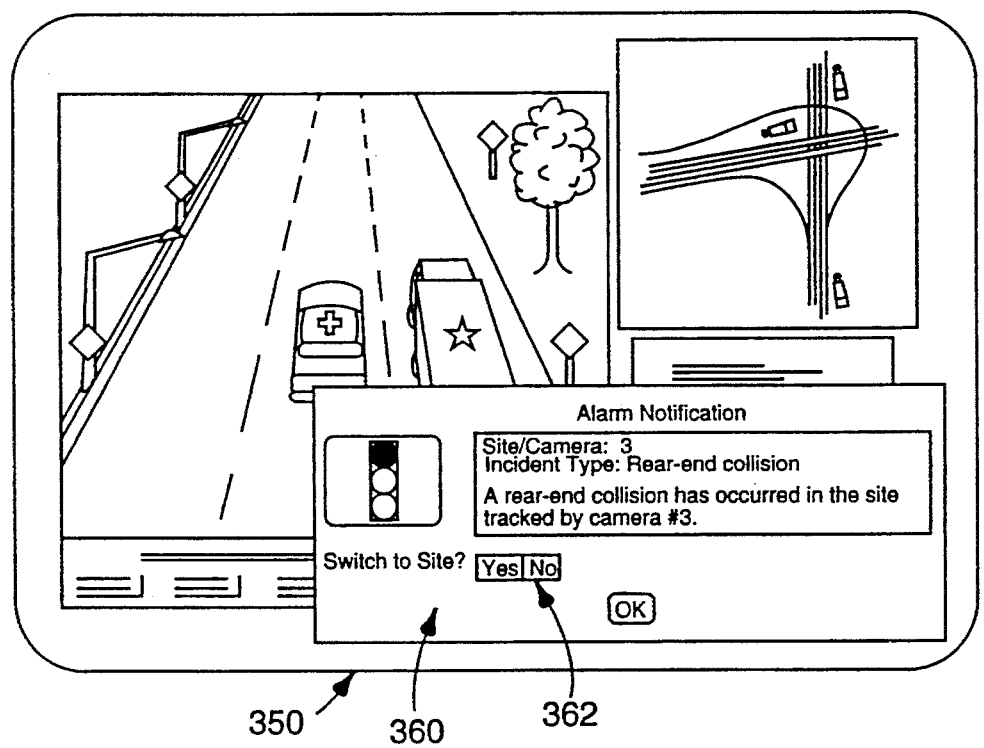
FIG. 14 is a graphical representation of an image displayed by the monitor of a graphical user interface, illustrating an alarm message.

A graphical user interface of the video image processing system for vehicle classification and tracking is shown in FIG. 13. The graphical user interface aids traffic engineers and analysts by presenting live video of a traffic site and all relevant traffic information for that site in a single integrated display. The traffic engineers may choose any one of a plurality of video feeds to view, along with its associated traffic information. Further, when image processors detect incidents, the users are automatically notified through the graphical user interface. Video screen image 300 includes a live video window 310 of one scene in the highway system. The graphical user interface is window-based and menu-driven. Users make requests by selecting options from menus or by selecting push buttons. Besides video window 310, traffic statistics, maps, or other information may be shown in a windows-type format and may be selectively chosen, sized and arranged, at the discretion of the traffic engineer. System map 320 shows location of video cameras with respect to the roadway layout, and summary traffic information 330 for the current scene being reviewed is displayed graphically in real-time. The total display can further include specific operating switches 340 or operating menus within the same screen display. Real-time alarm messages, based on alarm information generated by image processors or the traffic interpreter, are automatically generated and displayed as a shown in FIG. 14. Alarm conditions may include, for example, off-road vehicles, excessive lateral vehicular acceleration, wrong way vehicle or excessive weaving. The video screen 350 of the graphical user interface can be overwritten with alarm window 360 with appropriate switches 362.

Although a preferred embodiment has been illustrated and described for the present invention, it will be appreciated by those of ordinary skill in the art that any method or apparatus which is calculated to achieve this same purpose may be substituted for the specific configurations and steps shown. This application is intended to cover any adaptations or variations of the present invention. Therefore, it is manifestly intended that this invention be limited only by the appended claims and the equivalents thereof.

What is claimed is:

1. A machine vision system comprising:
   image acquisition means for acquiring images from three-dimensional space;
   means for determining the magnitude of vertical and horizontal edge element intensity components of each pixel of said image;
   means for converting said vertical and horizontal edge element intensity components to a first vector with a magnitude of total edge element intensity and a direction for each said pixel within said image;
   means for defining regions of interest within said image;
   means for fuzzifying said first vectors in said regions of interest to create a second vector characterizing each said region of interest;
   a neural network for interpreting said second vector of each said region of interest to determine a classification of said object;
   means for generating a signal indicative of said classification of said object; and
   interface means for providing an interface with external devices.

2. The machine vision system according to claim 1 wherein said image acquisition means comprises a plurality of video cameras.

3. The machine vision system according to claim 2, further comprising switching means electrically interconnected between said plurality of video cameras and said interface means for selectively choosing one of said plurality of video cameras.

4. The machine vision system according to claim 1, wherein said image processing means further comprises traffic interpreting means for analyzing signals indicative of classification generated by said image processing means and for converting said signals to alarm and statistical information.

5. The machine vision system according to claim 1, wherein said image processing means further comprises means for mapping pixel space to real world measurements.

6. The machine vision system according to claim 4, wherein said interface means comprises:
   display means for graphically displaying:
   real-time video output from said image acquisition means;
   said statistical information; and
   said alarm information; and
   input means for conveying user requests to said system.

7. The machine vision system according to claim 1, wherein said interface means comprises a traffic control device system.

8. The machine vision system according to claim 1, wherein said interface means comprises a database.

9. The machine vision system according to claim 1, further comprising digitizing means for digitizing said images acquired by said image acquisition means.

10. The machine vision system according to claim 6, wherein said image processing means is further programmed to execute the step of placing an icon on said object displayed on said display means based on said signal indicative of classification of said object.

11. A method for classifying objects in an image, comprising the computer implemented steps of:
   determining the magnitude of vertical and horizontal edge element intensity components of each pixel of said image;
   converting said vertical and horizontal edge element intensity components to a first vector with a magnitude of total edge element intensity and a direction for each said pixel within said image;
   defining regions of interest within said image;
   applying fuzzy set theory to said first vectors in regions of interest to create a second vector characterizing each said region of interest;
   interpreting said second vector of each said region of interest with a neural network whereby said neural network determines a classification of said object based on said second vector; and
   generating a signal indicative of said classification of said object.

12. The method for classifying objects in an image according to claim 11, further comprising the computer implemented steps of:
   dividing said image into overlapping regions; and
   selecting said regions of interest from said overlapping regions by selecting regions which meet predetermined criteria.

13. The method for classifying objects in an image according to claim 12, wherein said overlapping regions comprise overlapping, substantially trapezoidal regions.

14. The method for classifying objects in an image according to claim 12, wherein said image comprises a first portion and a second portion, said overlapping regions only covering said first portion of said image.

15. The method for classifying objects in an image according to claim 11, further comprising the computer implemented step of mapping said pixel space to real world measurements.

16. The method for classifying objects in an image according to claim 15, further comprising the computer implemented step of dynamically dividing said image into appropriately sized and shaped overlapping regions based on said step of mapping said pixel space.

17. The method for classifying objects according to claim 12, wherein selecting said regions of interest which meet predetermined criteria comprises the computer implemented steps of:
   calculating an average total edge dement intensity of a candidate region based on the average of said magnitude of total edge element intensity of all pixels within said candidate region;
   comparing said average total edge element intensity of said candidate region with a baseline average edge element intensity value; and
   selecting said candidate region to be a region of interest if said total edge element intensity of said candidate region exceeds said baseline edge element intensity value.

18. The method for classifying objects according to claim 12, wherein selecting region of interest which meet predetermined criteria comprises the computer implemented steps of:
   calculating an average total edge element intensity of a candidate region based on the average of said magnitude of total edge element intensity of all pixels within said candidate region; and
   selecting said candidate region to be a region of interest if said average total edge element intensity of said candidate region is a local maxima.

19. The method for classifying objects in an image according to claim 11, wherein determining the magnitude of vertical and horizontal edge element intensity components of each pixel of said image comprises the computer implemented steps of:
   defining a first kernel for convolution;
   defining a second kernel for convolution;
   applying said first kernel to each pixel within said region of interest, thereby computing said horizontal edge element intensity value;
   applying said second kernel to each pixel within said region of interest, thereby computing said vertical edge element intensity value; and
   assigning each pixel within said region of interest said horizontal and vertical edge element intensity values.

20. The method for classifying objects in an image according to claim 19, wherein computing said degree of horizontal and vertical edge element intensity comprises evaluating pixel intensities in an area surrounding each pixel of said plurality of pixels.

21. The method for classifying objects in an image according to claim 20, wherein evaluating pixel intensities in an area surrounding each pixel comprises determining the degree of contrast of the pixels surrounding the evaluated pixel.

22. The method for classifying objects in an image according to claim 11, wherein said image is provided by real-time video.

23. The method for classifying objects in an image according to claim 22, further comprising the computer implemented step of stabilizing said image provided by real-time video.

24. The method for classifying objects in an image according to claim 23, wherein stabilizing said image comprises the computer implemented steps of:
   providing at least one reference marker in said image;
   comparing said image containing said at least one reference marker to a reference image;
   calculating a compensation translation and rotation for said image; and
   warping said image, based on said translation and rotation calculation.

25. The method for classifying objects in an image according to claim 11, wherein applying fuzzy set theory to said first vectors in each said region of interest comprises computer implemented steps of:
   applying fuzzy set theory according to the location of each said pixel in said image;
   applying fuzzy set theory according to the angle of each said pixel; and
   weighting the angle associated with each said pixel according to said magnitude of intensity.

26. The method for classifying objects in an image according to claim 11, further comprising the computer implemented step of segmenting said image into object related pixels and non-object related pixels.

27. The method for classifying objects in an image according to claim 25, wherein applying fuzzy set theory according to the location of each said pixel in said image comprises the computer implemented steps of:

placing overlapping tent functions over each said region of interest, said tent functions substantially pyramidal in shape and each said tent function weighting each said pixel beneath said tent function according to the height of said tent function at the location of said pixel;

apportioning said intensity of each said pixel to generalized locations corresponding to the locations of said tent functions, said apportionment according to said weighting of said pixels.

28. The method for classifying objects in an image according to claim 27, wherein each said tent function has a unit height at its vertex and wherein the sum of the heights of said overlapping tent functions at any pixel location is equal to said unit height.

29. The method for classifying objects in an image according to claim 27, wherein said step of placing overlapping tent functions over each said region of interest comprises placing nine overlapping tent functions over each said region of interest.

* * * * *

UNITED STATES PATENT AND TRADEMARK OFFICE
CERTIFICATE OF CORRECTION

PATENT NO.: 5,434,927  Page 1 of 2
DATED: July 18, 1995
INVENTOR(S): Mark J. Brady, Darin G. Cerny, Michelle C. Granholm, Belayneh W. Million It is certified that error appears in the above-identified patent and that said Letters Patent is hereby corrected as shown below:

| | |
|---|---|
| Col. 4, line 50 | "FIG. 1" should start a new paragraph |
| Col. 6, line 32 | "a" should read --$a$--<br>"$t_a$" should read --$t_a$-- |
| Col. 6, line 33 | "a" first occurrence should read --$a$-- |
| Col. 6, line 36 | "a + 1" should read --$a + 1$-- |
| Col. 6, line 37 | "time$t_{(a+1)}$" should read --time $t_{(a+1)}$-- |
| Col. 7, line 24 | "a" should read --$a$-- |
| Col. 7, line 29 | "(i,j)" should read --$(i,j)$-- |
| Col. 7, line 44 | "(i,j)" should read --$(i,j)$-- |
| Col. 8, line 26 | "a" should read --$a$-- |
| Col. 8, line 27 | "a-1 and a+1" should read --$a-1$ and $a+1$-- |
| Col. 10, line 52 | "a" should read --$a$--<br>"$t_a$" should read --$t_a$-- |
| Col. 10, line 59 | "(a+1), (a+2)...(a+n)" should read --$(a+1), (a+2)...(a+n)$-- |
| Col. 10, line 60 | "$t_{(a+1)}, t_{(a+2)}...t_{(a+n)}$" should read --$t_{(a+1)}, t_{(a+2)}...t_{(a+n)}$-- |
| Col. 11, line 5 | "a" should read "$a$" |
| Col. 11, line 6 | "$t_a$" should read --$t_a$-- |
| Col. 11, line 43 | "$t_a$" should read --$t_a$-- |

UNITED STATES PATENT AND TRADEMARK OFFICE
CERTIFICATE OF CORRECTION

PATENT NO. : 5,434,927
DATED : July 18, 1995
INVENTOR(S) : Mark J. Brady, et al

It is certified that error appears in the above-indentified patent and that said Letters Patent is hereby corrected as shown below:

| | |
|---|---|
| Col. 11, line 47 | "$t_{(a+1)}$" should read --$t_{(a+1)}$-- |
| Col. 11, line 56 | "reduce" should read --reduced-- |
| Col. 12, line 24 | "(u,v)" should read --(u,v)-- |
| Col. 12, line 26, | "$R_\delta$is" should read --$R_\delta$ is-- |
| Col. 12, line 27 | "k" should read --k-- |
| Col. 12, line 28 | "(u,v)" should read --(u,v)--<br>"M" should read --M-- |
| Col. 12, line 31 | "$\Sigma$" should read --$\Sigma$-- |
| Col. 15, line 56 | "dement" should read --element-- |

Signed and Sealed this

Third Day of December, 1996

*Attest:*

BRUCE LEHMAN

*Attesting Officer*      *Commissioner of Patents and Trademarks*